Oct. 10, 1939.     H. E. BALLARD     2,175,867
VALVE
Filed Jan. 15, 1937     2 Sheets-Sheet 1

INVENTOR.
Herman E. Ballard
BY
Albert J. Henderson
his ATTORNEY.

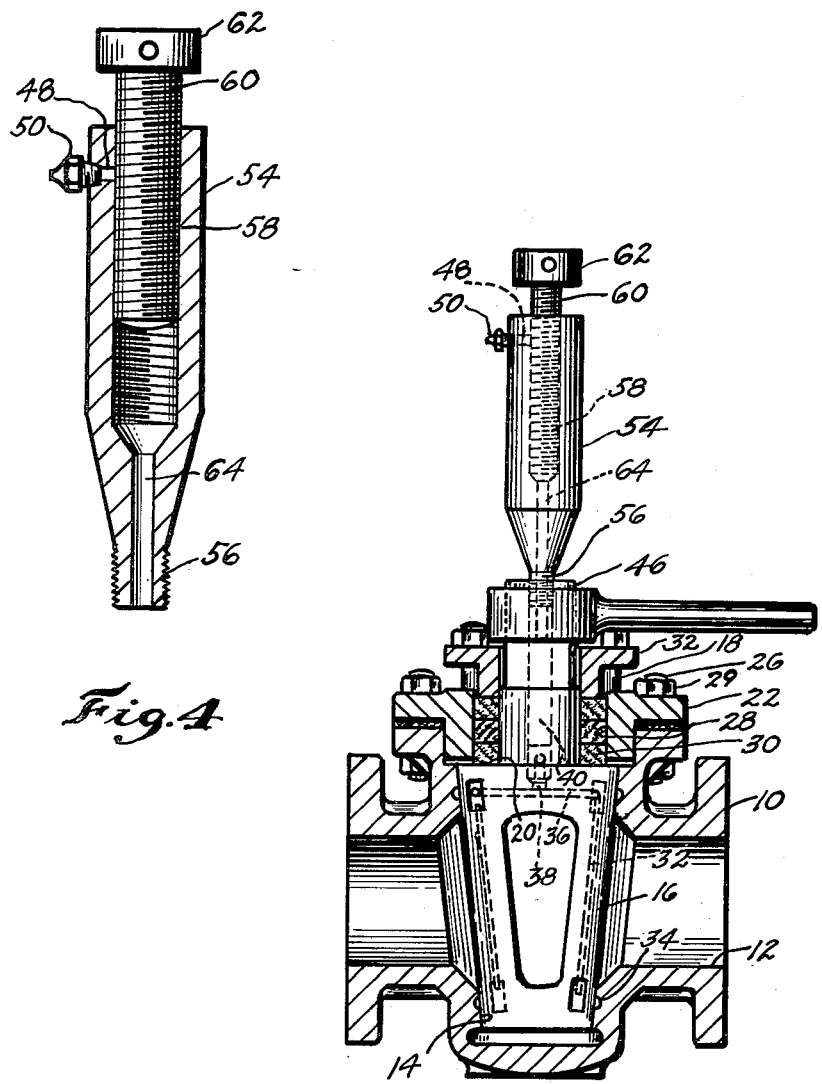

Patented Oct. 10, 1939

2,175,867

UNITED STATES PATENT OFFICE 2,175,867

VALVE

Herman E. Ballard, Berkeley, Calif., assignor to Walworth Patents Inc., Boston, Mass., a corporation of Massachusetts Application January 15, 1937, Serial No. 120,725

1 Claim. (Cl. 251—93)

This invention relates to valves and more particularly to lubricating devices therefor.

In the construction of lubricated valves it is customary to provide a reservoir into which lubricant in stick form may be inserted and forced to the seating surfaces by pressure exerted by a compressor screw operating in the reservoir. The stick form of lubricant is convenient to handle and is satisfactory for many services to which these valves are put. In some services, however, the temperature of the line fluid or the atmosphere may vary considerably so that a lubricant which is semi-solid at ordinary atmospheric temperatures will not flow when the temperature is greatly reduced. For example, when the valves are employed for handling propane, the temperatures may vary from a low of minus thirty-five degrees Fahrenheit to plus sixty-five degrees Fahrenheit. Consequently, a semi-fluid lubricant must be used which cannot be maintained in stick form and must be applied to the valve by means of a grease-gun or cup. A valve having only provision for use of stick lubricant could not be used in such services, as will be apparent.

An object of this invention is to permit lubricant in either stick or bulk form to be used in one and the same valve.

Another object of the invention is to retain all the advantages of the stick form lubrication when using lubricant in bulk form.

Another object of the invention is to utilize the usual compressor screw of lubricated valves for forcing lubricant under high pressures to the seating surfaces in combination with other apparatus for supplying the lubricant so used.

Another object of the invention is to insure that the full capacity of the reservoir will be available when either stick or bulk form lubricant is used.

Another object of the invention is to render the lubricating device of the invention applicable to existing valves without substantial change in design.

Other objects and advantages will become apparent from the following description taken in connection with the accompanying drawings, wherein:

Fig. 3 is a front elevation of a lubricated valve shown partly in longitudinal section and embodying a further alternative form of the invention, and Fig. 4 is an enlarged longitudinal sectional view of the lubricating device shown in Fig. 3, separated from the valve.

Figures 1, 2:
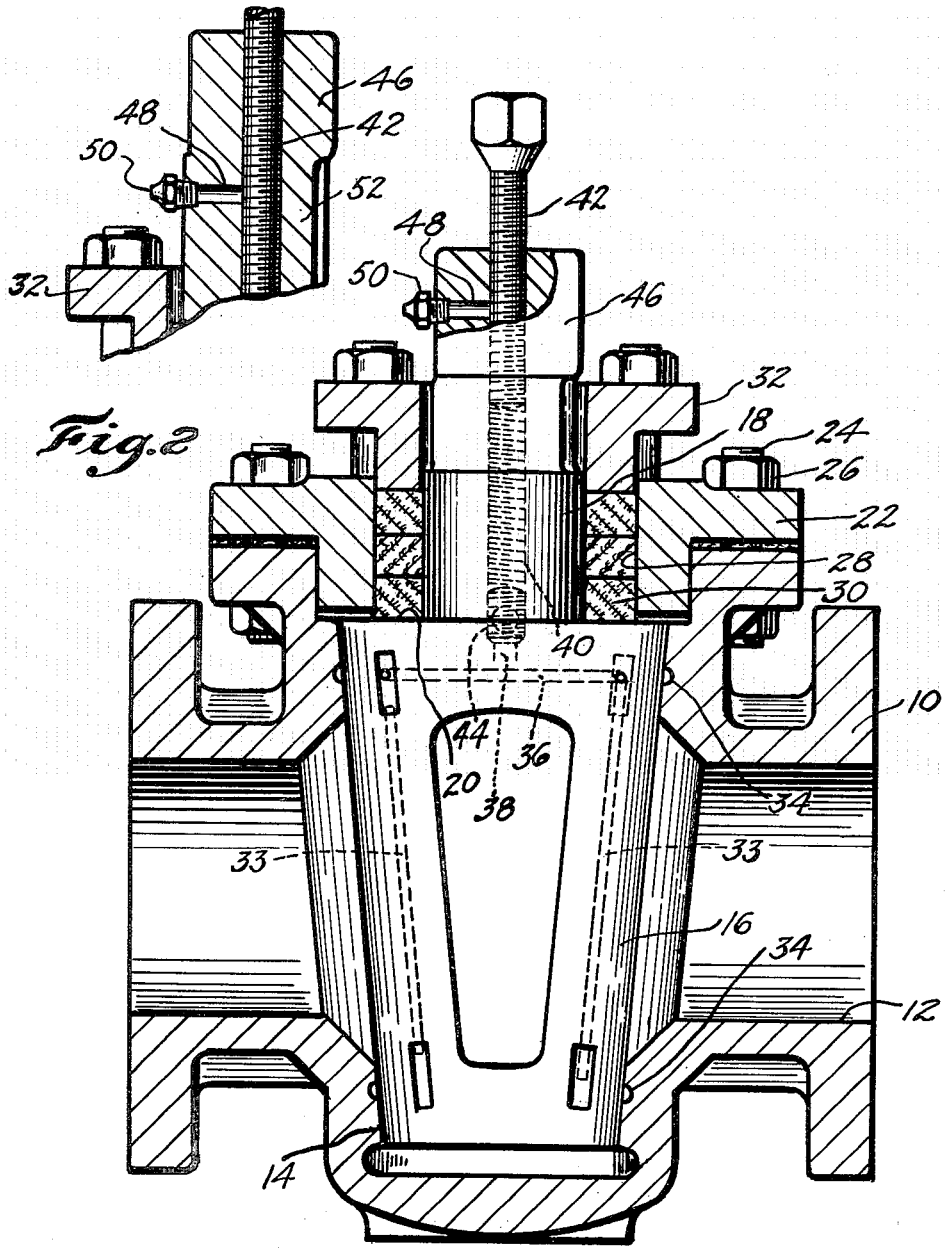
Fig. 1 is a front elevation of a lubricated valve embodying the invention.
Fig. 2 is a fragmentary sectional view of a valve embodying an alternative form of the invention.

In referring more particularly to the drawings, it will be observed that the lubricating device is shown as applied to a lubricated plug valve, but it will be understood that this specific application is merely for the purpose of illustration and that the invention is not confined to this particular type of valve. The lubricated plug valve shown in Fig. 1 comprises a body 10 having a fluid passageway 12 intersected by a tapered seating surface 14. Cooperating with the seating surface 14 is a tapered plug member 16 provided with a stem 18 at its larger end defining a shoulder 20 on the plug member 16. The plug member 16 may be retained in its seat by means of a cover member 22 secured to the body 10 by means of the bolts 24 and nuts 26. The plug retaining member 22 has a bore 28 spaced from the periphery of the stem 18 to form a stuffing box within which packing 30 may be compressed by means of the packing gland 32.

Lubricant may be distributed to the seating surfaces of the plug member 16 and its seat 14 by means of longitudinal grooves 33 and circumferential grooves 34 formed in the seating surfaces. The lubricant may be supplied to these grooves by a duct 36 communicating with an outlet 38 of a reservoir 40 extending axially of the stem 18. The reservoir 40 is preferably threaded throughout its length and into the open end thereof opposite the outlet is received a compressor screw 42. At the bottom of the reservoir adjacent the outlet is a check valve 44 which functions to prevent reflux of lubricant from the grooves when the compressor screw is removed.

From the foregoing description it will be apparent that when the compressor screw is removed lubricant in stick form may be inserted in the reservoir 40. The compressor screw may then be replaced and advanced into the reservoir to force the lubricant therefrom to the seating surfaces. However, as previously explained, it is not always feasible to utilize lubricant in such form and means have accordingly been provided to permit the insertion of lubricant in bulk form.

Accordingly, the upper portion of the stem 18, which is usually provided with a polygonal portion 46 for the reception of a wrench is, in this instance, provided with an opening 48 extending transversely of the axis of the stem 18 and communicating with the reservoir 40. This opening 48 is threaded at its outer end for the reception of a common type of grease-gun connection 50. Preferably, the grease-gun connection 50 and the opening 48, which forms an inlet therefor to the reservoir, are located sufficiently below the open end of the reservoir 40 in order that the compressor screw 42 may be retracted beyond the opening 48 without being completely withdrawn from the reservoir. In this manner lubricant may be supplied to the reservoir 40 through the connection 50 while the compressor screw 42 forms a closure for the open end of the said reservoir.

The operation of the device will be apparent from the foregoing description. Should the valve be used on services where the stick form of lubricant is not suitable then the compressor screw may be withdrawn beyond the opening 48 and bulk lubricant supplied to the reservoir through the connection 50. When the reservoir becomes filled with lubricant so supplied the compressor screw may be operated in the usual manner to force the lubricant to the seating surfaces, thus avoiding the necessity for using the grease-gun for this purpose.

It will be observed that the application of the lubricating device may be made to the standard form of lubricated plug valve without a substantial change in design. All that is necessary is to provide the polygonal portion of the stem with the opening 48 and the grease-gun connection 50. Should the projection of the grease-gun connection 50 beyond the surface of the stem be considered undesirable it would be a simple matter to provide a recess to house the connection particularly on the larger sizes of valves. As another expedient, the alternative form shown in Fig. 2 could be adopted. In this embodiment the stem portion 2 of the valve is made somewhat longer than that described in connection with the form shown in Fig. 1 and the opening 48 and connection 50 may be located below the polygonal portion 46. In this embodiment the grease-gun connection does not interfere with the application of a box wrench to the polygonal portion, as will be apparent. Should it be desired to repack the valves, shown in Figs. 1 and 2 it would be a simple matter to remove the connection 50 whereupon the packing gland 32 could be removed.

A further alternative form of the invention is shown in Fig. 3. The valve to which the invention is applied may be similar in all respects to that described in connection with the preceding forms and consequently, similar reference numerals have been used for the corresponding parts and further description thereof is deemed unnecessary. In this embodiment the usual compressor screw 42 shown in Fig. 1 is discarded. In place thereof there is provided a tubular member 54 having a reduced threaded end which is adapted for fluid tight engagement with the reservoir 40. Extending axially of the tubular member 54 from the end opposite the threaded connection 56 to a point substantially midway between its ends is a bore 58 suitably threaded for the reception of a compressor screw 60. The compressor screw 60 may be provided with a head 62 suitably drilled for the reception of a turning tool or may be of polygonal conformation to receive a wrench or other tool whereby it may be rotated and thus advanced into the reservoir 58. A reduced passage 64 leading from the reservoir 58 forms an outlet through which lubricant from the reservoir 58 may flow to the reservoir 40 of the plug valve.

In this instance a transverse opening 48 is provided in the side wall of the tubular member 54 adjacent the upper end thereof and communicating with the reservoir 58. A grease-gun connection 50 is secured in the opening 48 at its outer end and lubricant in bulk form may be supplied to the reservoir 58 in the same manner as described in connection with the embodiment shown in Fig. 1.

It will be apparent that the tubular member 54, as shown in Fig. 3, functions essentially in the same manner as does the reservoir, compressor screw and grease-gun connection in the embodiment shown in Fig. 1. It will further be apparent that when the tubular member 54 is utilized there need be no structural alteration whatsoever in standard valves and furthermore, a considerably larger quantity of lubricant may be stored for use in the valve. Moreover, the tubular member 54 may be supplied as a structural appurtenance for valves previously marketed and thus finds a wide field of usefulness.

I claim:

In a lubricated valve, the combination of a body member having a seat and a valve member having a surface engaging said seat, a stem extending from said valve member and projecting beyond said body, a threaded lubricant reservoir associated with said stem extending axially thereof from said projecting end and terminating in an outlet to the seating surfaces, a compressor screw adapted to form a closure for said reservoir and advanceable therein from said projecting end to exert pressure on the lubricant to force it through said outlet, a check valve in said reservoir at the junction with said outlet to prevent reflux of lubricant from the seating surfaces into said reservoir, a lateral opening in one side of the projecting end of said stem to the lubricant reservoir, and a grease-gun fitting associated with said lateral opening, whereby retraction of said compressor screw in the reservoir sufficiently to uncover said lateral opening will permit lubricant in bulk form to be introduced into the reservoir through said fitting and the complete removal of said compressor screw will permit the insertion of lubricant in stick form.

HERMAN E. BALLARD.